US011187344B2

(12) United States Patent
Qiu et al.

(10) Patent No.: US 11,187,344 B2
(45) Date of Patent: *Nov. 30, 2021

(54) QUICK CHANGE VALVE TRIM ASSEMBLY

(71) Applicant: Fisher Controls International LLC, Marshalltown, IA (US)

(72) Inventors: Yan Qiu, Marshalltown, IA (US); Guo Dong Chua, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/878,310

(22) Filed: May 19, 2020

(65) Prior Publication Data

US 2020/0278044 A1  Sep. 3, 2020

Related U.S. Application Data

(63) Continuation of application No. 15/922,853, filed on Mar. 15, 2018, now Pat. No. 10,655,745.

(51) Int. Cl.
*F16K 27/02* (2006.01)
*G05D 16/00* (2006.01)
*F16K 1/38* (2006.01)
*F16K 1/12* (2006.01)
*F16K 39/02* (2006.01)
*F16K 3/24* (2006.01)
(Continued)

(52) U.S. Cl.
CPC ............ *F16K 27/0254* (2013.01); *F16K 1/06* (2013.01); *F16K 1/12* (2013.01); *F16K 1/38* (2013.01); *F16K 1/54* (2013.01); *F16K 3/246* (2013.01); *F16K 3/314* (2013.01); *F16K 27/041* (2013.01); *F16K 39/022* (2013.01); *G05D 16/00* (2013.01);
(Continued)

(58) Field of Classification Search
CPC .......... F16K 27/0254; F16K 1/38; F16K 1/12; F16K 1/42

See application file for complete search history.

(56) References Cited

U.S. PATENT DOCUMENTS 3,298,389 A ‡ 1/1967 Freeman .................... F16K 1/12
137/454.6
5,964,248 A ‡ 10/1999 Enarson ................ F01D 17/143
137/62

(Continued)

FOREIGN PATENT DOCUMENTS

CN          205190796 U  ‡  4/2016

OTHER PUBLICATIONS

International Search Report and Written Opinion for PCT/US2019/020883, dated Jun. 3, 2019.‡

*Primary Examiner* — Kevin L Lee
(74) *Attorney, Agent, or Firm* — Marshall, Gerstein & Borun LLP

(57) ABSTRACT

A pressure regulator includes a valve body having a fluid inlet and a fluid outlet connected by a fluid passageway. An orifice is disposed between the fluid inlet and the fluid outlet. A valve seat is disposed within the fluid passageway. A movable valve plug is disposed within the fluid passageway, and the valve plug interacts with the valve seat to selectively open or close the fluid passageway. A cage is disposed in the fluid passageway, the cage surrounds the valve plug, and the cage includes a mechanical stop that limits movement of the valve plug within the cage away from the valve seat.

20 Claims, 5 Drawing Sheets

(51) Int. Cl.

| | |
|---|---|
| *F16K 1/06* | (2006.01) |
| *F16K 1/54* | (2006.01) |
| *F16K 27/04* | (2006.01) |
| *F16K 3/314* | (2006.01) |
| *F16K 41/02* | (2006.01) |
| *F16K 1/42* | (2006.01) |
| *F16K 47/08* | (2006.01) |

(52) U.S. Cl.
CPC .............. *F16K 1/427* (2013.01); *F16K 41/02* (2013.01); *F16K 47/08* (2013.01)

(56) References Cited

U.S. PATENT DOCUMENTS

| | | | |
|---|---|---|---|
| 7,152,628 B2 ‡ | 12/2006 | Folk ........................ | F16K 25/04 |
| | | | 137/625.33 |
| 7,373,951 B2 ‡ | 5/2008 | Gossett ................... | F16K 47/08 |
| | | | 137/625.33 |
| 7,578,314 B2 ‡ | 8/2009 | McCarty ................... | F16K 1/34 |
| | | | 137/625.33 |
| 10,655,745 B2 * | 5/2020 | Qiu et al. ................... | F16K 1/06 |
| 2003/0192601 A1 ‡ | 10/2003 | Baumann ................ | F16K 47/08 |
| | | | 137/62 |
| 2010/0301253 A1 ‡ | 12/2010 | Perrault ................. | F16K 3/243 |
| | | | 251/33 |
| 2012/0319027 A1 * | 12/2012 | Dobbs et al. ........... | F16K 3/246 |
| | | | 251/359 |
| 2016/0116072 A1 ‡ | 4/2016 | Westwater ............... | F16K 1/42 |
| | | | 251/170 |

\* cited by examiner
‡ imported from a related application

QUICK CHANGE VALVE TRIM ASSEMBLY

CROSS-REFERENCE TO RELATED APPLICATION

This application is a continuation of U.S. patent application Ser. No. 15/922,853, filed on Mar. 15, 2018 and now U.S. Pat. No. 10,655,745, the entire disclosure of which is hereby incorporated by reference herein.

FIELD OF THE DISCLOSURE

The present invention relates to control valves, and more particularly to a pressure regulator trim assembly that is removable as a unit to reduce repair and/or replacement time.

BACKGROUND

Pressure regulating valves/pressure regulators are used in myriad industrial and residential applications for controlling the downstream pressure of a fluid. For example, in chemical processing plants or oil refineries, pressure regulating valves are used to manipulate a flowing fluid to compensate for increases or decreases in demand, or other load disturbances, and thus keep the fluid pressure regulated. Similarly, pressure regulating valves may be used in plumbing fixtures to maintain a pre-determined pressure of fluid that automatically adjusts to variations in demand, such as anti-scald valves in showers or faucets. By controlling downstream pressure, pressure regulating valves compensate for variations in downstream demand. For example, as downstream demand increases, pressure regulating valves open to allow more fluid to flow through the pressure regulating valve, thus maintaining a relatively constant downstream pressure. On the other hand, as downstream demand decreases, pressure regulating valves close to reduce the amount of fluid flowing through the pressure regulating valve, again maintaining a relatively constant downstream pressure.

Pressure regulating valves have trim assemblies to control and/or characterize the flow of fluid through the valve. These trim assemblies include a movable control element, such as a valve plug, a valve seat, and a cage that retains the valve plug and characterizes the fluid flow through the valve.

Pressure regulating valves can be categorized as either balanced or unbalanced. Unbalanced valves typically have high pressure inlet fluid on one side of the valve plug and lower pressure outlet fluid on the other side of the valve plug. Unbalanced valves sometimes suffer from damage that occurs to the valve seat. In unbalanced valves with high inlet pressures, the fluid pressure acting on large valve orifices can crush the valve seat. This damage may require repair or replacement. Similarly, balanced valves can also suffer from damage or wear that requires occasional maintenance or repair.

When the valve cage in certain trim assemblies needs to be removed and/or replaced, the standard removal process includes first removing a bonnet that is attached to the valve body to access the internal components, such as the trim assembly. Next, the valve plug is removed by applying force to the valve stem, which pulls the valve plug out of the cage and thus out of the valve body. Finally, the cage may be removed. In cages having thin walls, the cage often becomes stuck within the valve body, thereby necessitating tapping additional lifting holes in the cage wall for extraction. This is a very time consuming and costly process. In other valves, a build up of material, for example magnetite in high pressure bypass valves, may cause the cage to stick within the valve body.

SUMMARY

In accordance with an exemplary aspect, a pressure regulator includes a valve body having a fluid inlet and a fluid outlet connected by a fluid passageway, and an orifice disposed between the fluid inlet and the fluid outlet. A valve seat is disposed within the fluid passageway. A movable valve plug is disposed within the fluid passageway, the valve plug interacting with the valve seat to selectively open or close the fluid passageway. A cage is disposed in the fluid passageway, the cage surrounds the valve plug, and the cage includes a mechanical stop that limits movement of the valve plug relative to the cage away from the valve seat.

In accordance with another exemplary aspect, a trim assembly includes a valve seat and a valve plug, the valve plug being movable relative to the valve seat, the valve plug interacting with the valve seat to selectively open or close the valve seat. A cage is disposed in the fluid passageway, the cage surrounding the valve plug, and the cage including a mechanical stop that limits movement of the valve plug relative to the cage away from the valve seat.

In accordance with another exemplary aspect, a method of removing a trim assembly from a pressure regulator includes removing a bonnet from the pressure regulator, pulling on a valve stem that is connected to a valve plug to move the valve plug in relation to a cage until the valve plug engages a mechanical stop on the cage, and continuing to pull on the valve stem until the valve plug and the cage are extracted from a valve body as a unit.

The foregoing aspects may be combined with any one or more of the following preferred forms as well with other aspects and/or additional aspects, arrangements, features, and/or technical effects that are apparent upon detailed inspection of the Figures and the following description.

In one preferred form, the mechanical stop is an internal ring having a smaller diameter than a widest diameter on the valve plug.

In another preferred form, the cage includes a first region having a first diameter and a second region having a second diameter, the first diameter being larger than the second diameter and both the first and second diameters being larger than the internal ring diameter.

In another preferred form, the first region is located farther from the valve seat than the second region.

In another preferred form, the first region accommodates a piston ring and the second region accommodates a bore seal.

In another preferred form, the valve plug includes a balance passage.

In another preferred form, the valve seat is one of a welded seat, a bolted seat, a clamped seat, and a hung threaded seat.

In another preferred form, the trim assembly includes a plug seal retainer, the plug seal retainer securing a plug seal against the valve plug, and the plug seal forming a seal between the valve plug and the cage.

BRIEF DESCRIPTION OF THE DRAWINGS

The aforementioned features, advantages, and aspects of the present invention, will be apparent from the following description and accompanying drawings, wherein.

DETAILED DESCRIPTION

An illustrative embodiment of the present invention relates to a valve trim assembly for a pressure regulating valve that is removable from a valve body as a unit, thereby reducing removal and/or replacement time and eliminating the need for tapping extraction bores in a valve cage. The valve trim assembly includes a valve plug and a cage having a mechanical stop that prevents movement of the valve plug relative to the cage beyond a fully retracted position, thereby engaging the valve plug with the cage at the fully retracted position so that the valve plug and the cage are removable from the valve body as a unit.

Figure 1:
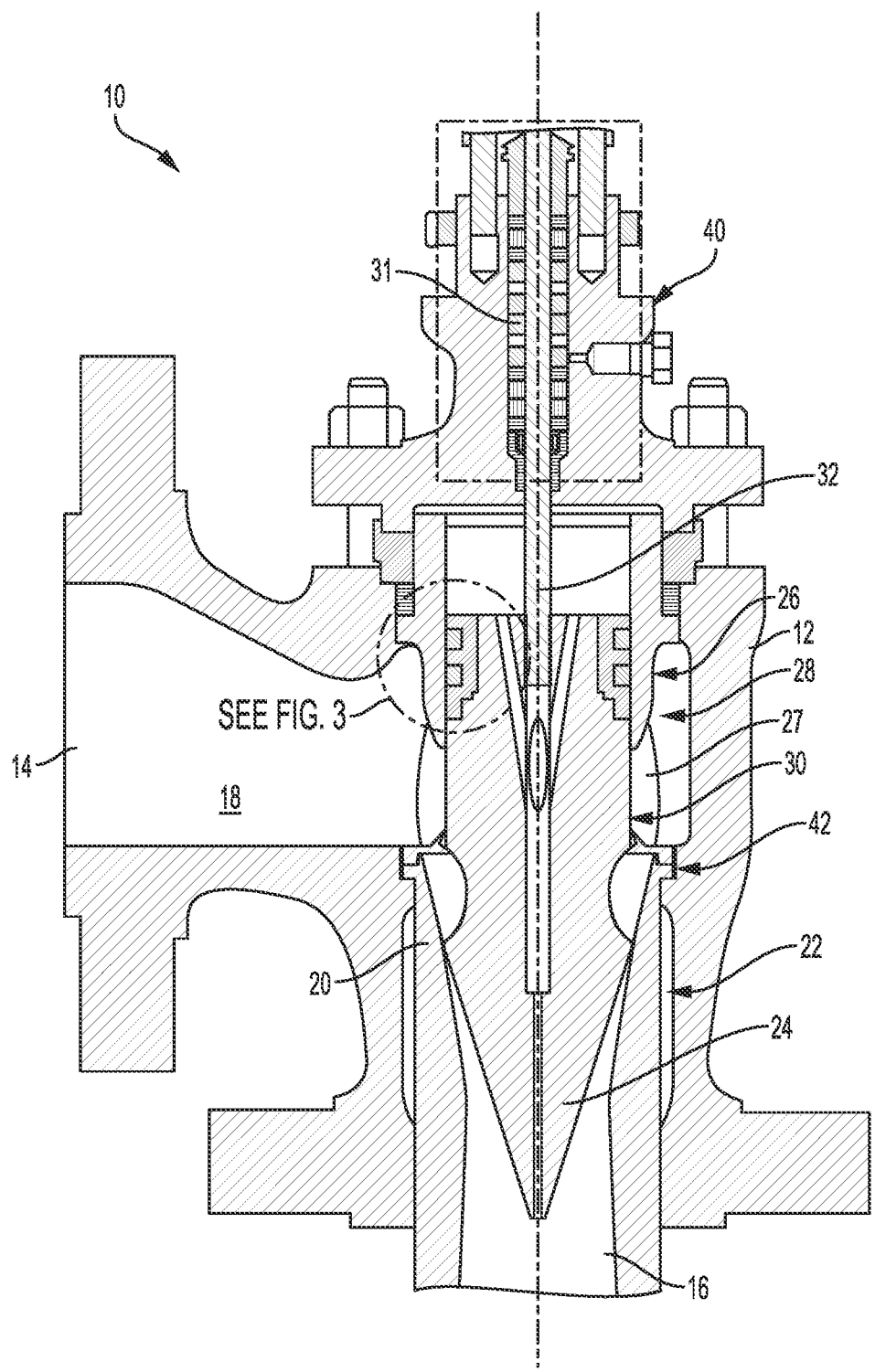
FIG. 1 is a cross-sectional view of a pressure regulator including a trim assembly constructed in accordance with the teachings of the disclosure.

Turning now to FIG. 1, a pressure regulator 10 includes a valve body 12 having a fluid inlet 14 and a fluid outlet 16 connected by a fluid passageway 18. An orifice 20 is disposed between the fluid inlet 14 and the fluid outlet 18. A valve seat 22 is disposed within the fluid passageway 18. A movable valve plug 24 is disposed within the fluid passageway 18, the valve plug 24 interacting with the valve seat 22 to selectively open or close the fluid passageway 18. The valve seat 22 may be welded, bolted, clamped, or hung/threaded in the valve body 12.

A cage 26 is disposed in the fluid passageway 18. The cage 26 surrounds the valve plug 24, and the cage 26 includes a mechanical stop 30 that limits movement of the valve plug 24 within the cage 26 in a direction away from the valve seat 22. The valve plug 24 contacts the mechanical stop 30 in a fully retracted position thereby preventing any further movement of the valve plug 24, relative to the cage 26, in a direction away from the valve seat 22. The cage 26 may also include one or more openings 27 that allow fluid to flow through the cage 26 when the valve plug 24 is in an open position, spaced away from the valve seat 22. The openings 27 may characterize fluid flow through the cage 26, for example, by smoothing the flow, and/or by reducing a pressure gradient.

The valve plug 24 and the cage 26 form a trim assembly 28. In some embodiments, the trim assembly 28 may also include one or more of the valve seat 22 and a valve stem 32. The trim assembly 28 is configured to be removable from the valve body 12 as a unit. In other words, at least the valve plug 24 and the cage 26 are removed as a single unit from the valve body 12 during repair or replacement of the trim assembly 28. This configuration advantageously reduces repair or replacement time and/or eliminates the need to tap additional bores in the cage 26 if the cage 26 is stuck within the valve body 12.

Conventional packing and/or seals 31 may be provided around the valve stem 32 to enable the valve stem 32 to reciprocate with little to no leakage. The valve stem 32 couples to the valve plug 24 at one end and to an actuator (not shown) at the other. The actuator reciprocatingly moves the valve stem 32, thereby moving the valve plug 24 between open and closed positions.

The pressure regulator 10 may include a bonnet 40 that is attached to the valve body 12. The bonnet 40 is removable from the valve body 12 to allow installation and/or removal of the trim assembly 28. The bonnet 40 may compress the cage 26 against the valve seat 22 to retain the valve seat 22 within the valve body 12. Other arrangements are possible, for example including additional elements such as load rings, when building control valves. As such, the present invention is not limited to the specific example configuration illustrated in the figures, but can include known variations.

In some embodiments, a gasket 42 may be installed between the valve seat 22 and the valve body 12 to prevent leaks when the valve plug 24 is in a closed position against the valve seat 22.

Figure 2:
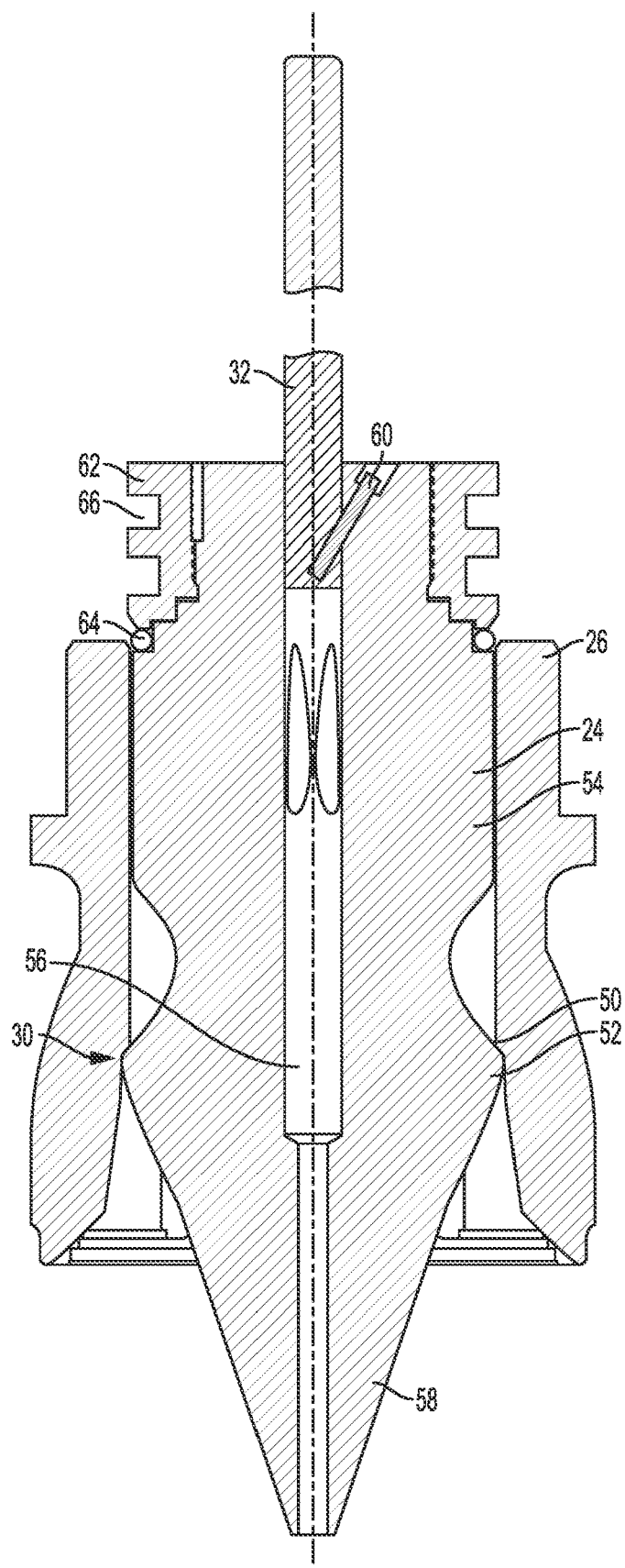
FIG. 2 is a cross-sectional view of a valve plug and a cage of the trim assembly of FIG. 1.

Turning now to FIG. 2, in some embodiments, the mechanical stop 30 is formed by an internal ring 50 that has a smaller diameter than a widest diameter on the valve plug 24. The widest diameter of the valve plug 24 may be formed by an annular ridge 52. The annular ridge 52 contacts the internal ring 50 when the valve plug 24 is in a fully retracted position. The annular ridge 52 prevents further relative movement (in the upward direction in FIG. 2) between the valve plug 24 and the cage 26.

The valve plug 24 may include a plug body 54 having one or more balance passages 56. In other embodiments, the plug body 54 may not have balance passages 56. A tapered end 58 extends away from the plug body 54, towards the valve seat 22 (not shown in FIG. 2). The annular ridge 52 may form a junction between the plug body 54 and the tapered end 58. In other embodiments, the annular ridge 52 may be formed at other locations on the plug body 54.

The valve stem 32 is secured to the valve plug 24. In the illustrated embodiment, a pin 60 secures the valve stem 32 to the valve plug 24. In other embodiments, other connection structures may secure the valve stem 32 to the valve plug 24. For example, a threaded, crimped, or welded connection may be used in other embodiments.

A plug seal retainer 62 is located at one end of the plug body 54 (distal to the tapered end 58 in the illustrated embodiment). The plug seal retainer 62 secures a plug seal 64 against the plug body 54 so that the plug seal 64 may seal the plug body 54 and the cage 26 when the valve plug 24 is disposed within the cage 26. The plug seal retainer 62 may include one or more annular channels 66 for receiving additional seals (such as PTFE or graphite seal rings), if desired.

Figure 3:
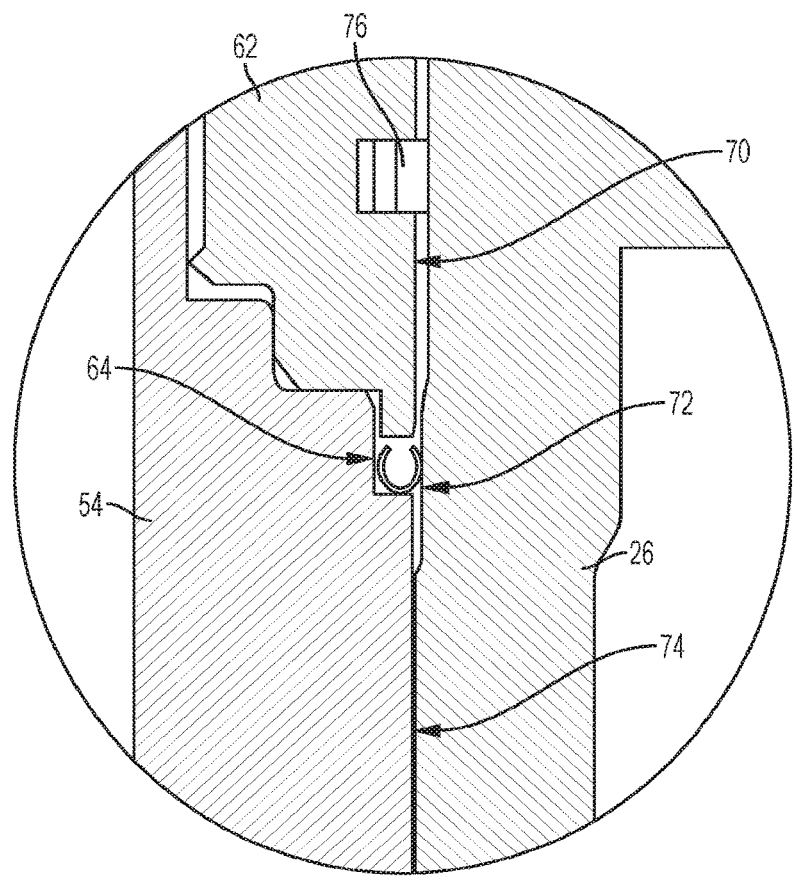
FIG. 3 is an enlarged cross-sectional view of the area labeled "SEE FIG. 3" of FIG. 1.

Turning now to FIG. 3, the cage 26 includes a first region 70 having a first diameter, a second region 72 having a second diameter, and a third region 74 having a third diameter. The first diameter is larger than the second diameter and the second diameter is larger than the third diameter. Each of the first diameter, the second diameter, and the third diameters are larger than the internal ring diameter. In other words, the internal ring diameter forms the third diameter 74, which is the smallest internal diameter of the cage 26.

The first region 70 accommodates a piston ring 76, the second region 72 accommodates the plug seal 64, and the third region 74 forms a guide surface for the plug body 54. The first region 70 is located farther from the valve seat 22 than the second region 72, and the second region 72 is located farther from the valve seat 22 than the third region 74.

Figure 4:
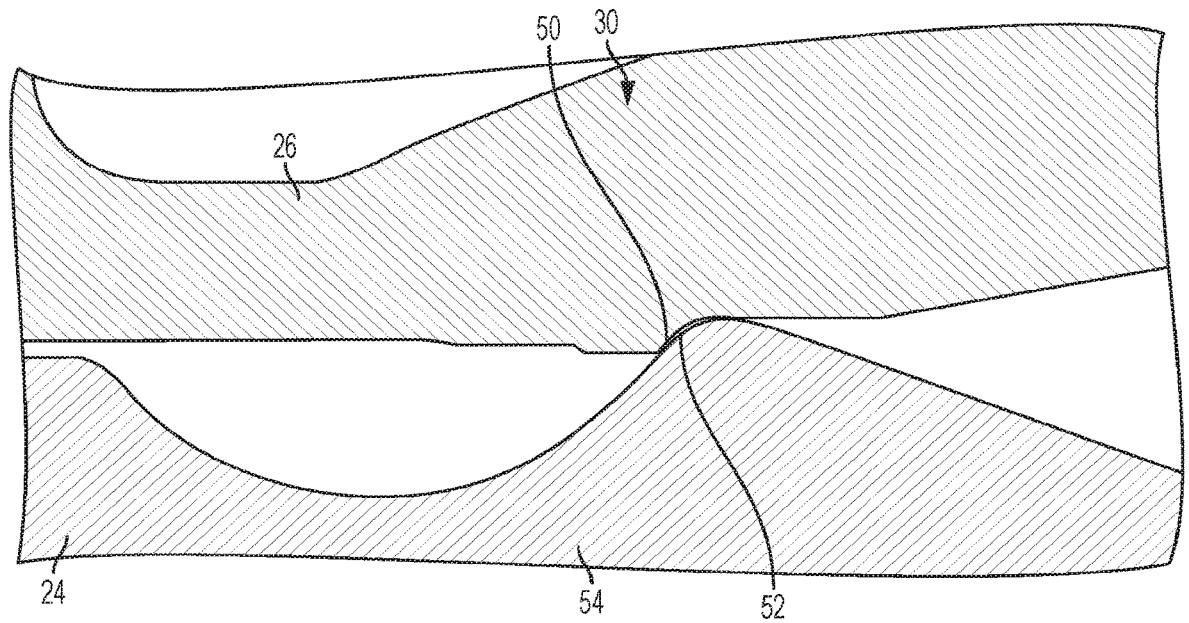
FIG. 4 is an enlarged cross-sectional view of a mechanical stop of the trim assembly of FIG. 1.

Turning now to FIG. 4, a close-up view of the mechanical stop 30 is illustrated. When the valve plug 24 is in a fully retracted position (which is illustrated in FIG. 4), the annular ridge 52 on the valve body 54 contacts the internal ring 50 on the cage 26. Thus, any force away from the valve seat 22 (e.g., to the left in FIG. 4) that is applied to the valve plug 24 (for example, by pulling on the valve stem, not shown) is transferred to the cage 26. Thereafter, the cage 26 and the valve plug 24 move as a unit in the direction away from the valve seat 22.

Figure 5:
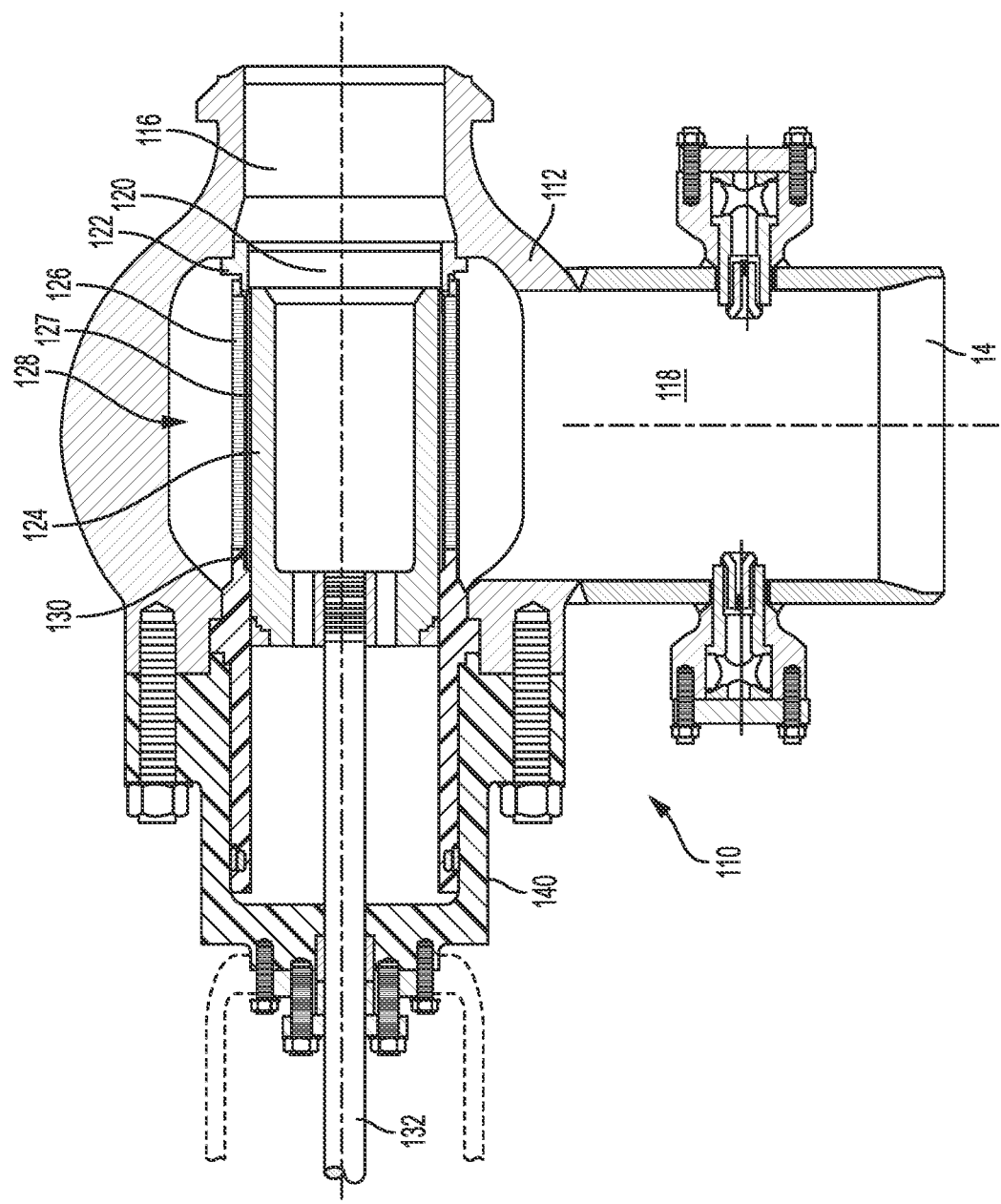
FIG. 5 is a cross-sectional view of an alternate embodiment of a pressure regulator including a trim assembly constructed in accordance with the teachings of the disclosure.
Figure 6:
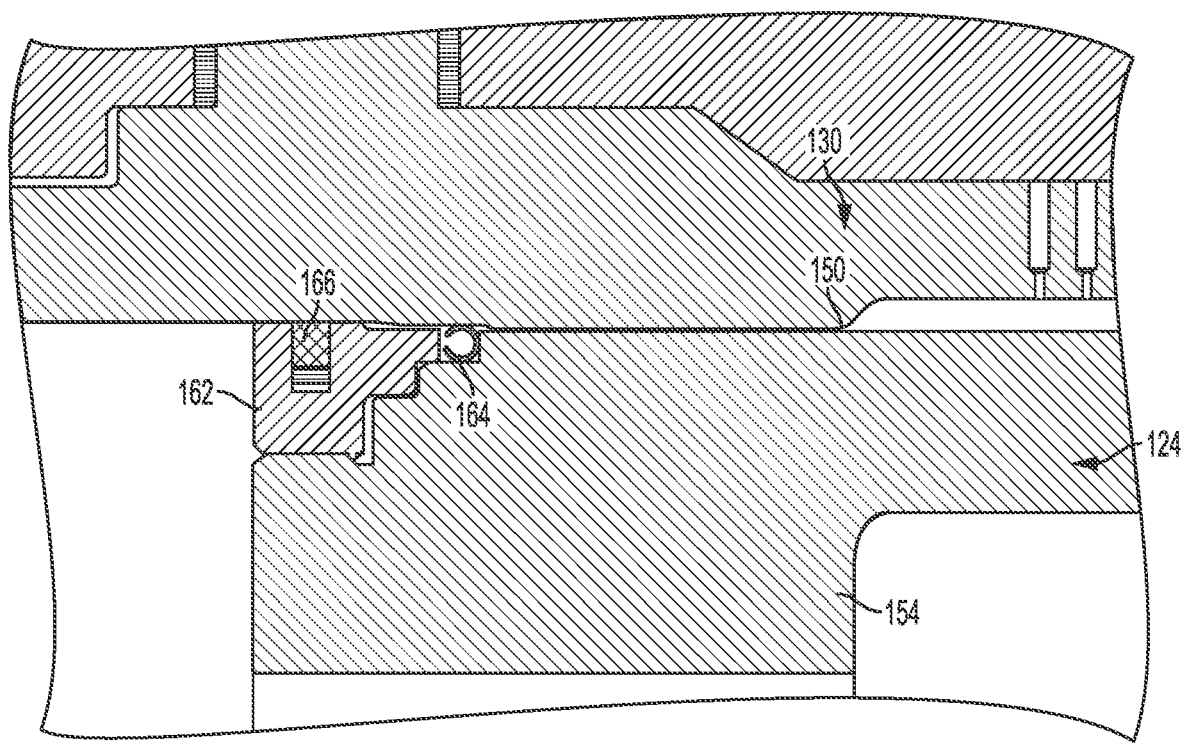
FIG. 6 is an enlarged cross-sectional view of the trim assembly of FIG. 5, with a valve plug being disposed in partially extended position relative to a valve seat.
Figure 7:
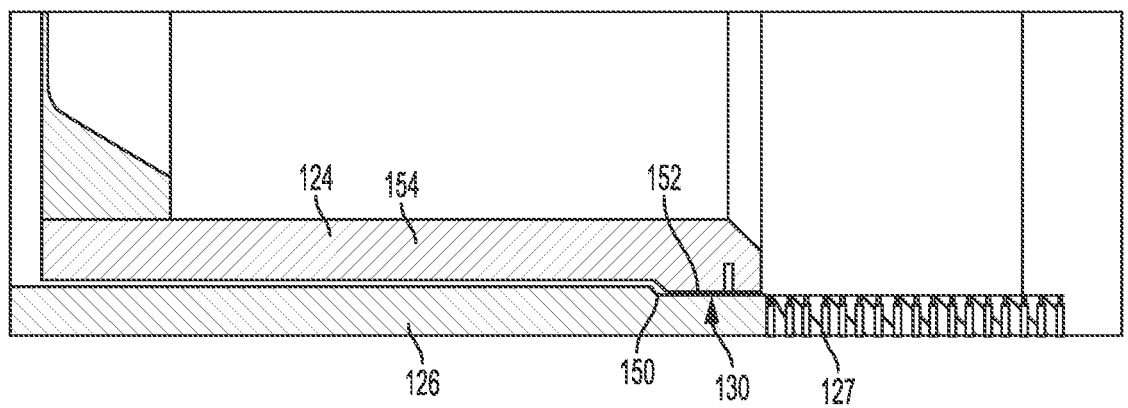
FIG. 7 is an enlarged cross-sectional view of the trim assembly of FIG. 5, with the valve plug being in a retracted position relative to the valve seat, the valve plug engaging a mechanical stop on a cage.

Turning now to FIGS. 5-7, an alternate embodiment of a pressure regulator 110 is illustrated. In the embodiment of FIGS. 5-7, components that correspond to components of the embodiment of FIGS. 1-4 are labeled with reference numbers that are exactly 100 greater than the embodiment of FIGS. 1-4. For example, the pressure regulator of the embodiment of FIGS. 5-7 is labeled "110" while the pressure regulator of the embodiment of FIGS. 1-4 is labeled "10".

The pressure regulator 110 includes a valve body 112 having a fluid inlet 114 and a fluid outlet 116 connected by a fluid passageway 118. An orifice 120 is disposed between the fluid inlet 114 and the fluid outlet 118. A valve seat 122 is disposed within the fluid passageway 118. A movable valve plug 124 is disposed within the fluid passageway 118, the valve plug 124 interacts with the valve seat 122 to selectively open or close the fluid passageway 118. A cage 126 is disposed in the fluid passageway 118. The cage 126 surrounds the valve plug 124, and the cage 126 includes a mechanical stop 130 that limits movement of the valve plug 124 within the cage 126 in a direction away from the valve seat 122. The valve plug 124 contacts the mechanical stop 130 in a fully retracted position thereby preventing any further movement of the valve plug 124 relative to the cage, away from the valve seat 122. The cage 126 may also include one or more openings 127 that allow fluid to flow through the cage 126 when the valve plug 124 is in an open position, spaced away from the valve seat 122. The openings 127 may characterize fluid flow through the cage 126, for example, by smoothing the flow, and/or by reducing a pressure gradient.

The valve plug 124 and the cage 126 form a trim assembly 128. In some embodiments, the trim assembly 128 may also include one or more of the valve seat 122 and a valve stem 132. The trim assembly 128 is configured to be removable from the valve body 112 as a unit. In other words, at least the valve plug 124 and the cage 126 are removed as a single unit from the valve body 112 during repair or replacement of the trim assembly 128. This configuration advantageously reduces repair or replacement time and/or eliminates the need to tap additional bores in the cage 126 if the cage 126 is stuck within the valve body 112.

The pressure regulator 110 may include a bonnet 140 that is attached to the valve body 112. The bonnet 140 is removable from the valve body 112 to allow installation and/or removal of the trim assembly 128.

In some embodiments, the mechanical stop 130 is formed by an internal ring 150 that has a smaller diameter than a widest diameter on the valve plug 124. The widest diameter of the valve plug 124 may be formed by an annular ridge 152. The annular ridge 152 contacts the internal ring 150 when the valve plug 124 is in a fully retracted position. The annular ridge 152 prevents further movement between the valve plug 124 and the cage 126 when the annular ridge 152 is engaged with the internal ring 150.

A plug seal retainer 162 is located at one end of the plug body 154. The plug seal retainer 162 secures a plug seal 164 against the plug body 154 so that the plug seal 164 may seal the plug body 154 and the cage 126 when the valve plug 124 is disposed within the cage 126. The plug seal retainer 162 may include one or more annular channels 166 for receiving additional seals (such as PTFE or graphite seal rings), if desired.

When the valve plug 124 is in a fully retracted position (which is illustrated in FIG. 7), the annular ridge 152 of the valve body 154 contacts the internal ring 150 on the cage 126. Thus, any force away from the valve seat 122 that is applied to the valve plug 124 (for example, by pulling on the valve stem) is transferred to the cage 126. Thereafter, the cage 126 and the valve plug 124 move as a unit in the direction away from the valve seat 122.

A method of removing a trim assembly 28, 128 from a pressure regulator 10, 110 includes removing the bonnet 40, 140 from the pressure regulator 10, 110, pulling on the valve stem 32, 132 that is connected to the valve plug 24, 124 to move the valve plug 24, 124 in relation to the cage 26, 126 until the valve plug 24, 124 engages the mechanical stop 30, 130 on the valve cage 26, 126, and continuing to pull on the valve stem 32, 132 until the valve plug 24, 124 and the cage 26, 126 are extracted from the valve body 12, 112 as a unit.

Although the present invention has been described with reference to the example embodiment illustrated in the figures, it should be understood that many alternative forms can embody the present invention. One of ordinary skill in the art will additionally appreciate different ways to alter the parameters of the embodiments disclosed, such as the size, shape, or type of elements or materials.

This description is to be construed as illustrative only and is for the purpose of teaching those skilled in the art how to make and use the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

What is claimed is:

1. A trim assembly for a pressure regulator, the trim assembly comprising:
   a valve seat;
   a valve plug including a first end, a second end, and an annular ridge disposed between the first end and the second end, the valve plug being movable relative to the valve seat to selectively open or close the valve seat; and
   a cage surrounding the valve plug, the cage including a mechanical stop that is disposed to engage the annular ridge to limit movement of the valve plug relative to the cage away from the valve seat.

2. The trim assembly of claim 1, wherein the cage includes a first region having a first diameter and a second region having a second diameter different from the first diameter, and wherein the mechanical stop is disposed between the first region and the second region.

3. The trim assembly of claim 2, wherein the valve plug slidably engages the first region of the cage.

4. The trim assembly of claim 2, wherein the mechanical stop comprises a shoulder disposed between the first region and the second region.

5. The trim assembly of claim 1, wherein the mechanical stop has a smaller diameter than a widest diameter of the valve plug.

6. The trim assembly of claim 1, wherein the cage comprises one or more openings configured to characterize fluid flow, and wherein the mechanical stop is disposed immediately adjacent the one or more openings.

7. The trim assembly of claim 1, further comprising:
a piston ring disposed between the valve plug and the cage; and
a bore seal disposed between the valve plug and the cage.

8. The trim assembly of claim 7, further comprising a plug seal retainer configured to secure the piston ring and the bore seal against the valve plug.

9. A trim assembly for a pressure regulator, the trim assembly comprising:
a valve seat;
a valve plug, the valve plug being movable relative to the valve seat to selectively open or close the valve seat; and
a cage surrounding the valve plug, the cage including a first region having a first diameter, a second region having a second diameter different from the first diameter, and a mechanical stop that limits movement of the valve plug relative to the cage away from the valve seat, wherein the mechanical stop is disposed between the first region and the second region.

10. The trim assembly of claim 9, wherein the valve plug slidably engages the first region of the cage.

11. The trim assembly of claim 10, wherein the second diameter is greater than the first diameter.

12. The trim assembly of claim 10, wherein the first region is located farther from the valve seat than the second region.

13. The trim assembly of claim 9, wherein the mechanical stop has a smaller diameter than a widest diameter of the valve plug.

14. The trim assembly of claim 9, further comprising:
a piston ring disposed between the valve plug and the first region of the cage; and
a bore seal disposed between the valve plug and the first region of the cage.

15. The trim assembly of claim 14, further comprising a plug seal retainer configured to secure the piston ring and the bore seal against the valve plug.

16. A pressure regulator, comprising:
a valve body having a fluid inlet and a fluid outlet connected by a fluid passageway;
a valve seat disposed within the fluid passageway;
a valve plug, the valve plug being movably disposed within the valve body, the valve plug being movable relative to the valve seat to selectively open or close the fluid passageway;
a cage disposed in the fluid passageway and surrounding the valve plug, the cage including a mechanical stop that limits movement of the valve plug relative to the cage away from the valve seat; and
a bonnet removably coupled to the cage.

17. The pressure regulator of claim 16, wherein the valve plug includes a first end, a second end, and an annular ridge disposed between the first end and the second end, and wherein the mechanical stop is disposed to engage the annular ridge to limit movement of the valve plug relative to the cage away from the valve seat.

18. The pressure regulator of claim 16, wherein the cage including a first region having a first diameter and a second region having a second diameter different from the first diameter, and wherein the mechanical stop is disposed between the first region and the second region.

19. The pressure regulator of claim 16, further comprising:
a piston ring disposed between the valve plug and the cage; and
a bore seal disposed between the valve plug and the cage.

20. The pressure regulator of claim 19, further comprising a plug seal retainer configured to secure the piston ring and the bore seal against the valve plug.

* * * * *

UNITED STATES PATENT AND TRADEMARK OFFICE
CERTIFICATE OF CORRECTION

PATENT NO. : 11,187,344 B2
APPLICATION NO. : 16/878310
DATED : November 30, 2021
INVENTOR(S) : Yan Qiu et al.

It is certified that error appears in the above-identified patent and that said Letters Patent is hereby corrected as shown below:

In the Specification

Column 3, Line 39, "fluid outlet 18." should be -- fluid outlet 16. --.

Column 4, Lines 64-65, "third diameter 74," should be -- third diameter, --.

Column 5, Line 28, "fluid outlet 118." should be -- fluid outlet 116. --.

Signed and Sealed this
Twenty-first Day of June, 2022

Katherine Kelly Vidal
*Director of the United States Patent and Trademark Office*